United States Patent
Yokoyama

Patent Number: 5,988,826
Date of Patent: *Nov. 23, 1999

[54] SURFACE LIGHT SOURCE DEVICE

[75] Inventor: Kazuaki Yokoyama, Ageo, Japan

[73] Assignee: Enplas Corporation, Kawaguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,211

[22] Filed: Apr. 17, 1996

Related U.S. Application Data

[63] Continuation of application No. 08/309,501, Sep. 23, 1994, abandoned.

[30] Foreign Application Priority Data

Mar. 25, 1993 [JP] Japan ........................................ 5-89514

[51] Int. Cl.$^6$ ............................................... F21V 7/04
[52] U.S. Cl. .................... 362/31; 362/26; 362/327; 362/330
[58] Field of Search ..................... 362/26, 31, 223, 362/329, 318, 327, 331, 330, 326; 349/61, 62, 63, 64, 65, 70

[56] References Cited

U.S. PATENT DOCUMENTS

| | | | |
|---|---|---|---|
| 4,729,067 | 3/1988 | Ohe | 362/26 |
| 4,729,068 | 3/1988 | Ohe | 362/31 |
| 4,937,709 | 6/1990 | Yanagi et al. | 362/31 |
| 5,093,765 | 3/1992 | Kashima et al. | 362/31 |
| 5,101,325 | 3/1992 | Davenport et al. | 362/31 |
| 5,130,888 | 7/1992 | Akahane | 362/31 |
| 5,134,549 | 7/1992 | Yokoyama | 362/223 |
| 5,161,873 | 11/1992 | Obata | 362/31 |
| 5,184,888 | 2/1993 | Sakuma et al. | 362/31 |
| 5,262,928 | 11/1993 | Kashima et al. | 362/31 |
| 5,349,503 | 9/1994 | Blonder et al. | 362/31 |

*Primary Examiner*—Thomas M. Sember
*Attorney, Agent, or Firm*—Jones Volentine, LLP

[57] ABSTRACT

Surface light source device having a light conducting member, a light source, a light diffusing member disposed on a front light incidence surface side of the light conducting member, and a light reflecting member arranged on a rear side of the light conducting member; and a refractive index of the light conducting member is arranged to be constant for a distance from the light incidence surface and then to be varied so as to be smaller as farther from the light source, to obtain a bright and uniform brightness distribution.

7 Claims, 2 Drawing Sheets

SURFACE LIGHT SOURCE DEVICE

This application is a continuation, of application Ser. No. 08/309,501 filed Sep. 23, 1994, now abandoned.

BACKGROUND OF THE INVENTION a) Field of the Invention

The present invention relates to a surface light source device which is used in back light systems of liquid crystal display devices.

b) Description of the Prior Art

FIG. 1 is a cross-sectional view showing a conventional surface light source device. In FIG. 1, the numerical reference 1 represents a linear light source such as a cold cathode ray tube, 2 a light conducting member made of a transparent material, 3 a light diffusing member and 4 represents a light reflecting member. In the surface light source device shown in FIG. 1, a light emitted from the light source 1 is made incident upon a light incident edge surface 2a of the light conducting member 2 and then introduced into the member 2. The light is transmitted inside of the member 2 to an opposite edge surface 2d side, being totally reflected by a front surface (a light emitting surface) 2b and a rear surface 2c of the light conducting member 2. On the rear surface 2c of the light conducting member 2, a coarse surface is arranged, a multiplicity of conical or polygonal unevenness is provided, or a pattern constituted of a multiplicity of fine diffusing portions is formed by printing to change a part of returning light, which is directly reflected by the rear surface 2c or passed through the rear surface 2c and then reflected by the light reflecting member 4, into diffusion light. The diffusion light is emitted from the front surface 2b (light emitting surface) of the light conducting member 2; and then passes through the light diffusing member 3 to form a surface light source of the liquid crystal display device.

If the distribution of the coarse surface, the heights and the top angles of the conical or polygonal-shaped unevenness, or the area and distribution density of the fine diffusing portions of the printing pattern, which is formed on the rear surface 2c of the light conducting member 2, is varied in a suitable manner, a uniform brightness distribution of the light emitted from the light emitting surface 2b of the light conducting member 2 can be obtained.

However, in the above-stated conventional surface light source device using a light conducting member, when the distribution of the coarse surface formed on the rear surface of the light conducting member, the heights of the conical or polygonal-shaped unevenness or inclined angles of the top portions thereof, or the variation of the distribution density of the printing pattern is not suitable, it is impossible to obtain a uniform brightness distribution of the light emitted from the light emitting surface, i.e. the light emitted from the light diffusing member. Therefore, in the conventional device, an arrangement of the above-said coarse surface distribution and its variation is very important to obtain a uniform surface light source. However, it is not so easy to obtain an optimum coarse surface distribution and its variation, and thus difficult to form the suitable coarse surface distribution, etc. on the rear surface of the light conducting member as designed first.

SUMMARY OF THE INVENTION

A purpose of the present invention is to provide a surface light source device which comprises a light conducting member, a light source disposed in the vicinity of one of the edge surfaces of the light conducting member, a light diffusing member disposed on a front surface side of the light conducting member and a light refracting member disposed on a rear surface side of the light conducting member; and said light conducting member is such designed that a refractive index thereof is constant to a given position, which is far from the light incident edge surface of the light conducting member by a given distance, but the refractive index is continuously varied from the position to an opposite edge surface of the light conducting member so as to become smaller as farther from the light source.

In the surface light source device according to the present invention, since the refractive index of the light conducting member is arranged to be constant on the light incident edge surface side, the light emitted from the light source and introduced into the light conducting member via the light incident surface travels inside of the light conducting member until the position as like as the light traveling in the conventional surface light source device; but since the refractive index is varied from the position so as to be continuously progressively decreased, the light travels inside of the light conducting member in the device according to the present invention, making a curve line after the light passed over the position. The light travels inside of the light conducting member, being loosely curved on the way in such a manner. Therefore, it is possible to increase the amount of light emitted from an area on the opposite edge surface side, where the amount of light emitted from the light emitting surface is comparatively small, which is far from the light incident edge surface of the light conducting member. Therefore, the surface light source having a uniform brightness distribution as a whole can be obtained according to the present invention. Further in the surface light source device according to the invention, the light, which cannot be used for illumination in the conventional device, is able to be emitted from the light conducting member, so that a much brighter surface light source device than the conventional device can be obtained.

The refractive index of the light conducting member of the surface light source device according to the present invention is within the range from 1.3 to 1.7; and it is desired to have a desired difference between the highest refractive index (the refractive index on the light incident edge surface side of the light conducting member) and the lowest refractive index (the refractive index on the opposite edge surface side, which is the farthest from the light incident edge surface of the light conducting member). If the refractive index exceeds over the upper limit of 1.7, an amount of light emitted from the light emitting surface of the light conducting member will be decreased, so that the use effect of light of the surface light source device will be decreased. On the other hand, if the refractive index is lowered exceeding over the lower limit of 1.3, an amount of light leaked from the light conducting member into an air will be increased.

DETAILED DESCRIPTION OF THE PREFERRED EMBODIMENT

An embodiment of the surface light source device according to the present invention will be explained below.

Figure 1:
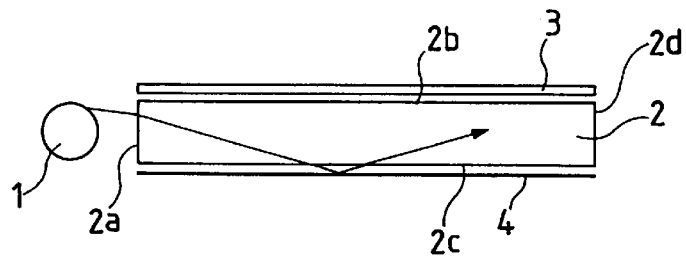
FIG. 1 is a cross-sectional view showing a conventional surface light source device.
Figure 2:
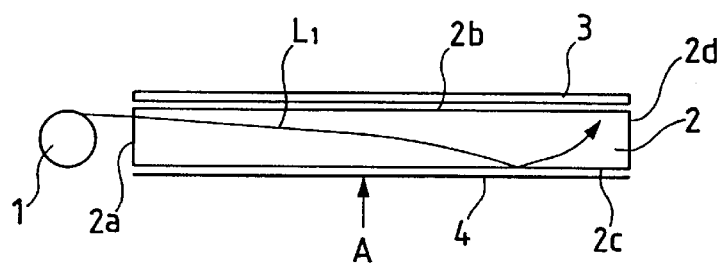
FIG. 2 is a cross-sectional view depicting a surface light source device according to the present invention.

FIG. 2 is a cross-sectional view showing an embodiment of the surface light source device according to the present invention. In FIG. 2, the numerical reference 1 represents a linear light source such as a cold cathode tube; 2 a light conducting member made of a transparent material, 3 a light diffusing member and the numerical reference 4 represents a light reflecting member. It should be noted that the surface light source device shown in FIG. 2 has the same construction as that of the conventional surface light source device, which is shown in FIG. 1, excepting the constitution of the light conducting member 2. The light conducting member 2 used in this embodiment is arranged such that a refractive index of material of the light conducting member 2 is constant from a light incident edge surface 2a thereof to an arbitrary point, which is, for example, shown by the reference symbol A, but the refractive index is varied from the point A to the opposite edge surface of the member so as to become continuously smaller.

Since the refractive index of material of the light conducting member 2 in the embodiment is varied to be continuously decreased on the way (from the point A in FIG. 2) as shown in FIG. 2, the light made incident upon the light incident edge surface 2a of the light conducting member 2 first travels straight inside the member 2a until the point A, but from the point A the light travels inside the member being largely curved in accordance with the variation of the refractive index of medium of the light conducting member 2 and an incident angle of the incident light. In this embodiment, since the light conducting member 2 is arranged such that the refractive index of the member is large on the light incident edge surface 2a side and the refractive index is continuously decreased from the point A to the opposite edge surface 2d of the member, the light travels inside of the light conducting member 2 so as to draw, for instance, a curve line L1. That is to say, the light emitted from the light source 1 is made incident upon the light incident edge surface 2a of the member 2, and then travels inside of the member 2 in a straight line until the point A, as illustrated by the lines L1, L2, and L3 in FIG. 3; but from the point A proceeds being curved as illustrated by the lines L1, L2 and L3, by which the light traveling inside the member 2 is represented, in FIG. 3. Therefore, the part of the member 2 from the light incident edge surface 2a to the point A of the light conducting member 2 has the same function as that of the light conducting member of the conventional surface light source device shown in FIG. 1; and thus, if the rear surface 2c of the light conducting member 2 is arranged as a uniform coarse surface, conical or polygonal unevenness having the same shape and the same dimension are uniformly formed on the rear surface 2c, or a uniform printing pattern is provided on the rear surface 2c, the amount of light emitted from the part of light emitting surface 2b of the light conducting member 2 is comparatively large. Further, in the other part from the point A to the opposite edge surface 2d of the light conducting member 2, the light travels inside of the member 2 being curved as typically shown by the lines L1, L2, and L3 in FIG. 3. In the conventional device, in which the refractive index of the light conducting member is arranged to be uniform, the rays shown by L1 and L2 travel straight inside of the member even from the point A and thus the rays of L1 and L2 are not emitted from the light emitting surface 2b of the member 2.

However, in this embodiment, the rays shown by L1 and L2 are curved in the other part, which is close to the opposite edge surface 2d, and thus these rays are emitted from the light emitting surface 2b. Therefore, in the device according to the present invention, the amount of light emitted from the light emitting surface 2b of the other part, which is far from the light source 1, is increased in comparison with the conventional device.

Figure 4:
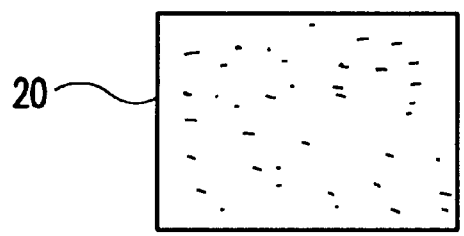
FIGS. 4–6 depict possible embodiments of a rear surface of a light conducting member in accordance with the invention.
Figure 5:
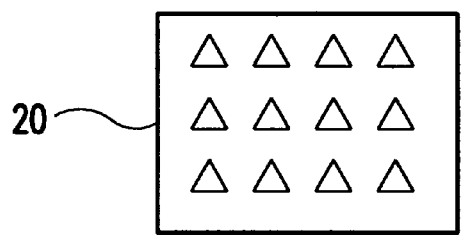
Figure 6:
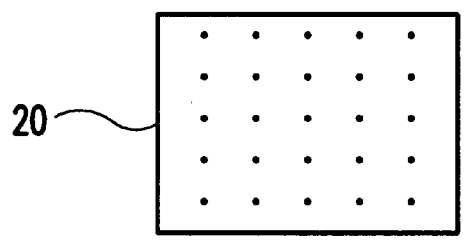

By such construction, even if the rear surface of the light conducting member 2 is arranged to be coarsened, (FIG. 4) the distribution of the conical or polygonal unevenness is formed on the rear surface of the light conducting member 2 in a uniform manner, (FIG. 5) or a uniform printing pattern is printed on the rear surface (FIG. 6) of the light conducting member 2, it is possible to prevent that it becomes extremely dark in a portion from the center of the light conducting member 2 (the center between the light incident edge surface 2a and the opposite edge surface 2d) to the opposite edge surface 2d; and the brightness distribution of the light emitted from the light emitting surface 2b of the light conducting member 2 becomes comparatively uniform.

Further, in case that the coarse surface, the conical or polygonal unevenness or the printing pattern is formed on the rear surface of the light conducting member with some variation, even if the variation is not continuously but intermittently with a predetermined distance, or the variation is not coincident with the original designed pattern in a precise manner, it is possible to make the brightness distribution of the light emitted from the light emitting surface of the light conducting member almost uniform.

As stated in the above, according to the present invention, it becomes much easier to design the distribution of the coarse surface, the shape, dimension and distribution of the conical or polygonal unevenness, or the area or the distribution density of the fine diffusion portions (FIG. 6) of the printing pattern. Further, even if the coarse surface, conical or polygonal unevenness or the printing pattern is formed to be a little bit deviated from those as originally designed, the distribution of the amount of light emitted from the light emitting edge surface of the light conducting member can be made uniform. Furthermore, the light, for example, shown by the line L1 and L2, which is not used as an illuminating light and wasted in the conventional surface light source device, can be effectively used for illumination; and thus a bright surface light source device can be obtained.

Figure 3:
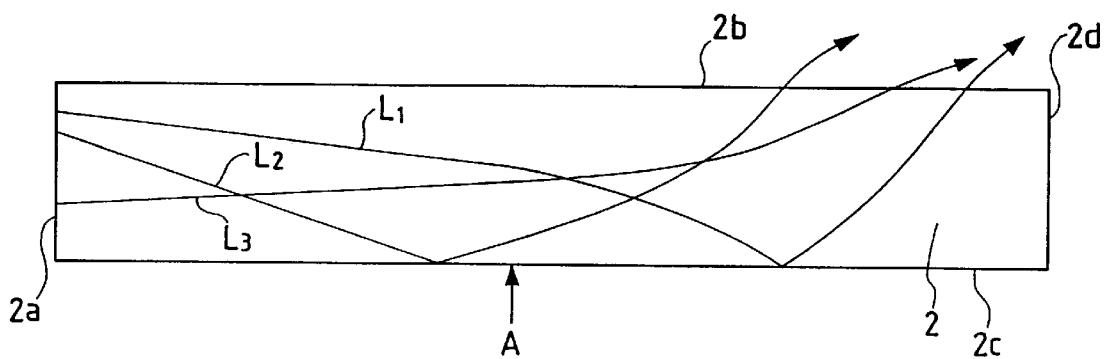
FIG. 3 is a cross-sectional view illustrating a condition that a light travels in the light conducting member of the surface light source device according to the present invention.

In case a coarse surface or a multiplicity of dots are provided on the rear surface 2c as a whole of the light conducting member 2, or fine diffusing portions constituted of a multiplicity of dots, or fine diffusion portions having coarse surface thereon is provided on the rear surface 2c as a whole in the conventional device, the amount of light emitted from the light emitting surface 2b of the member 2 is decreased. But in the embodiment according to the invention, by making the refractive index of material of the light conducting member 2 to decrease in the way, the light is curved as shown in FIG. 3 and thus the amount of light emitted from the light emitting surface of the member as a whole is not decreased, so a surface light source device having a uniform brightness distribution can be obtained. In this case, even if the coarseness of the coarse surface is large or the density of dots formed on the rear surface of the member 2 is small, the uniform brightness distribution can be obtained. Therefore, such coarse surface or the dots can be formed in an easy manner.

Furthermore, it may be possible to prevent that such light emitting condition that brightness of the light emitting surface varies to become slightly darker as farther from the light source 1, which is caused when the coarse surface or the density of dots formed on the rear surface of the light conducting member (vary the density of coarse surface or dots so as to be small on the light source side and slightly increase the density as farther from the light source), is duly varied by making the refractive index of the light conducting member continuously vary.

In this case, the density of distribution of dots formed on the rear surface 2c of the light conducting member 2 arranged to continuously increase as farther from the light source 1. Since to increase the density of distribution slightly can be acceptable, the density does not become large so much even in the portion which is the farthest from the light source, i.e. in the vicinity of the opposite edge surface 2d. Therefore, the dots can be formed on the rear surface of the light conducting member 2 in a comparatively easy manner.

As stated in the above, according to the present invention, in both the cases that the dots are formed on the rear surface 2c of the light conducting member 2 with uniform distribution of density, and with varied distribution of density, the amount of light emitted from the light emitting surface 2b of the member is increased, so that the brightness of the surface light source device becomes larger than the conventional device.

Further, when providing a multiplicity of conical or polygonal unevenness on the rear surface 2c of the light conducting member 2, it may be possible to make the variation of height and top angle of the unevenness looser in comparison with those of the conventional surface light source device; and when printing a pattern on the rear surface 2c, the variation of density of distribution of the pattern which is looser than the conventional device, may be acceptable in the device according to the invention.

Moreover, it is possible to make the dimension of the conical or polygonal unevenness as a whole smaller than that of the conventional device, or it is also possible to make the thickness of ink, which is used for printing a pattern small. Thereby, the difference in the brightness between the portion of the light emitting surface 2b, which is corresponding to the portion of the rear surface 2c where conical or polygonal unevenness are formed, and the portion of the light emitting surface 2b, which is corresponding to the portion where conical or polygonal unevenness are not formed, or the difference in the brightness between the portion of the light emitting surface 2b, which is corresponding to the portion of the rear surface 2c where the printing pattern is formed and the portion of the light emitting surface 2b, which is corresponding to the portion where the printing pattern is not formed, becomes small, so that the surface light source device having a uniform brightness distribution can be obtained.

If the refractive index of the light conducting member is too high, the ratio of the light reflected by the light incidence edge surface 2a of the light conducting member 2 when the light emitted from the light source 1 is made incident upon the light incidence edge surface 2a becomes large, so that the amount of light introduced inside of the light conducting member 2 is decreased. In order to prevent the problem, it is effective to provide a light antireflection film on the light incidence edge surface 2a of the light conducting member; thereby the reflection by the light incident edge surface 2a is decreased and the amount of light introduced inside of the member 2 would be increased.

In this embodiment, the refractive index of medium of the light conducting member 2 should be varied in the range between 1.3 to 1.7; and it is desired to have a predetermined difference between the lowest refractive index and the highest refractive index.

As stated in the above, in the surface light source device according to the present invention, since the refractive index of medium of the light conducting member is continuously varied on the way, it becomes easy to form a coarse surface on the rear surface of the light conducting member; and the amount of light emitted from the light conducting member as a whole is increased to obtain a bright surface light source device.

What is claimed is:

1. A surface light source device comprising:
   a single layer light conducting member having a single light incident edge surface and an opposite edge surface, a linear light source disposed to direct light through said light incident edge surface, a light diffuising member disposed on a front surface side of said light conducting member, and a light reflecting member disposed on a rear surface side of said light conducting member;
   said light conducting member consisting essentially of a first region extending from said light incident edge surface to a position intermediate said incident edge surface and said opposite edge surface and having a constant refractive index, and a second region extending continuously from said position to said opposite edge surface and having a variable refractive index;
   wherein said variable refractive index is equal to said constant refractive index at said position, and wherein said variable refractive index continuously decreases toward said opposite edge surface, said light conducting member having no boundary surfaces where the refractive index varies discontinuously.

2. A surface light source device according to claim 1, wherein said variable refractive index of said light conducting member is within a range of from 1.3 to 1.7.

3. A surface light source device according to claim 1 or 2, wherein said rear surface of said light conducting member is arranged as a coarse surface.

4. A surface light source device according to claim 1 or 2, wherein a pattern consisting of a multiplicity of fine diffusion portions is formed on said rear surface of said light conducting member.

5. A surface light source device according to claim 1 or 2, wherein a multiplicity of conical or polygonal unevenness are formed on said rear surface of said light conducting member.

6. A surface light source device according to claim 1 or 2, wherein a printing pattern is formed on said rear surface of said light conducting member.

7. A surface light source device comprising;
   a single layer light conducting member having a light incident edge surface and an opposite edge surface, a linear light source disposed in a vicinity of said light incident edge surface, a light diffusing member disposed on a front surface side of said light conducting member, and a light reflecting member disposed on a rear surface side of said light conducting member;
   wherein said light conducting member consists only of a first region having a constant refractive index and a second region having a variable refractive index, wherein said variable refractive index continuously decreases from said light incident edge surface to said opposite edge surface.

* * * * *